US008197989B2

(12) United States Patent
Jacobine et al.

(10) Patent No.: US 8,197,989 B2
(45) Date of Patent: Jun. 12, 2012

(54) UV-CURABLE FUEL CELL SEALANTS AND FUEL CELLS FORMED THEREFROM

(75) Inventors: Anthony F. Jacobine, Meriden, CT (US); John G. Woods, Farmington, CT (US); Steven T. Nakos, Andover, CT (US); Matthew P. Burdzy, South Windsor, CT (US); Brian R. Einsla, Chalfont, PA (US); Kevin J. Welch, Wallingford, CT (US)

(73) Assignee: Henkel Corporation, Rocky Hill, CT (US)

( * ) Notice: Subject to any disclaimer, the term of this patent is extended or adjusted under 35 U.S.C. 154(b) by 827 days.

(21) Appl. No.: 12/161,237

(22) PCT Filed: Jan. 16, 2007

(86) PCT No.: PCT/US2007/001069
§ 371 (c)(1),
(2), (4) Date: Jul. 17, 2008

(87) PCT Pub. No.: WO2008/016384
PCT Pub. Date: Feb. 7, 2008

(65) Prior Publication Data
US 2009/0004541 A1 Jan. 1, 2009

Related U.S. Application Data

(60) Provisional application No. 60/759,456, filed on Jan. 17, 2006.

(51) Int. Cl.
*H01M 8/02* (2006.01)
*B29C 45/14* (2006.01)

(52) U.S. Cl. .................. 429/535; 429/510; 264/272.11

(58) Field of Classification Search .................. 429/460, 429/508, 509, 510, 535; 264/272.11
See application file for complete search history.

(56) References Cited

U.S. PATENT DOCUMENTS

| 3,159,601 A | 12/1964 | Ashby et al. |
| 3,159,662 A | 12/1964 | Ashby et al. |
| 3,220,972 A | 11/1965 | Lamoreaux |
| 3,516,946 A | 6/1970 | Modic |
| 3,814,730 A | 6/1974 | Karstedt |

(Continued)

FOREIGN PATENT DOCUMENTS
EP 159477 A1 10/1985
(Continued)

*Primary Examiner* — Stephen J. Kalafut
(74) *Attorney, Agent, or Firm* — James E. Piotrowski; Steven C. Bauman (57) ABSTRACT

A fuel cell, having improved sealing against leakage, includes a fuel cell component having a cured sealant, wherein the cured sealant includes a telechelic-functional polyisobutylene, an organhydrogenosilane crosslinker, a platinum catalyst and a photoinitiator. The fuel cell component may be a cathode flow field plate, an anode flow field plate, a resin frame, a gas diffusion layer, an anode catalyst layer, a cathode catalyst layer, a membrane electrolyte, a membrane-electrode-assembly frame, and combinations thereof. A method for forming such a fuel cell includes the steps of providing a fuel cell component including a substrate; providing a mold having a cavity; positioning the mold so that the cavity is in fluid communication with the substrate; applying a curable liquid sealant composition into the cavity, wherein the curable sealant composition includes a telechelic-functional polyisobutylene, an organhydrogenosilane crosslinker, a platinum catalyst and a photoinitiator; and curing the composition with actinic radiation.

11 Claims, 5 Drawing Sheets

U.S. PATENT DOCUMENTS

| | | | |
|---|---|---|---|
| 5,264,299 A | 11/1993 | Krasij et al. | |
| 5,650,787 A * | 7/1997 | Lim et al. | 342/375 |
| 6,057,054 A | 5/2000 | Barton et al. | |
| 6,159,628 A | 12/2000 | Grasso et al. | |
| 6,165,634 A | 12/2000 | Krasij et al. | |
| 6,451,468 B1 | 9/2002 | Adachi | |
| 6,451,469 B1 | 9/2002 | Nakamura et al. | |
| 6,531,236 B1 * | 3/2003 | Hatoh et al. | 429/454 |
| 6,593,020 B1 | 7/2003 | Yoo et al. | |
| 6,649,097 B2 | 11/2003 | Sasaki et al. | |
| 6,656,580 B2 | 12/2003 | Woods | |
| 6,680,138 B1 | 1/2004 | Honma et al. | |
| 6,764,624 B2 | 7/2004 | Saito et al. | |
| 6,773,758 B2 | 8/2004 | Yamanaka | |
| 6,797,771 B2 * | 9/2004 | Sapper et al. | 524/728 |
| 6,824,874 B1 * | 11/2004 | Shah et al. | 428/413 |
| 6,864,009 B2 | 3/2005 | Yoo et al. | |
| 6,875,534 B2 | 4/2005 | Nakamura et al. | |
| 6,884,537 B2 | 4/2005 | Smith | |
| 6,942,941 B2 | 9/2005 | Blunk et al. | |
| 7,008,584 B2 | 3/2006 | Inuoe et al. | |
| 2002/0045046 A1 | 4/2002 | Sasaki et al. | |
| 2002/0122970 A1 | 9/2002 | Inuoe et al. | |
| 2003/0054225 A1 | 3/2003 | Kaji et al. | |
| 2003/0116185 A1 | 6/2003 | Oswald | |
| 2004/0161667 A1 | 8/2004 | Fukuzawa et al. | |
| 2004/0214066 A1 * | 10/2004 | Hatoh et al. | 429/34 |
| 2005/0100772 A1 * | 5/2005 | Ono | 429/33 |
| 2005/0263246 A1 | 12/2005 | Yandrasits et al. | |
| 2008/0289755 A1 * | 11/2008 | Burdzy et al. | 156/275.7 |
| 2009/0000732 A1 * | 1/2009 | Jacobine et al. | 156/273.5 |

FOREIGN PATENT DOCUMENTS

| | | |
|---|---|---|
| EP | 1059308 A1 | 12/2000 |
| KR | 2002-0091781 A | 12/2002 |
| KR | 2005-0118047 A | 12/2005 |
| WO | WO99/04446 | 1/1999 |
| WO | WO02/093672 | 11/2002 |
| WO | WO2004/047212 | 6/2004 |
| WO | WO2004/061338 | 7/2004 |
| WO | WO2004/079839 | 9/2004 |
| WO | WO2004/107476 | 12/2004 |
| WO | WO2005/074060 | 8/2005 |
| WO | WO2005/078839 | 8/2005 |
| WO | WO2007/084561 | 7/2007 |

* cited by examiner

UV-CURABLE FUEL CELL SEALANTS AND FUEL CELLS FORMED THEREFROM

FIELD OF THE INVENTION

The present invention relates to a sealant composition for bonding and sealing components of an electrochemical cell, such as a fuel cell, and an electrochemical cell formed therefrom. More particularly, the present invention relates to a UV-curable composition for sealing fuel cell components.

BRIEF DESCRIPTION OF RELATED TECHNOLOGY

There are various types of electrochemical cells, perhaps the most common of which being a fuel cell, such as a proton exchange membrane ("PEM") fuel cell. The PEM fuel cell contains a membrane electrode assembly ("MEA") provided between two flow field plates or bipolar plates. Gaskets are used between the bipolar plates and the MEA to provide seals thereat. Additionally, since an individual PEM fuel cell typically provides relatively low voltage or power, multiple PEM fuel cells are stacked to increase the overall electrical output of the resulting fuel cell assembly. Sealing is also required between the individual PEM fuel cells. Moreover, cooling plates are also typically provided to control temperature within the fuel cell. Such plates are also sealed to prevent leakage within the fuel cell assembly. After assembling the fuel cell stack is clamped to secure the assembly.

As described in U.S. Pat. No. 6,057,054, liquid silicone rubbers have been proposed for molding onto membrane electrode assemblies. Such silicone compositions, however, oftentimes may degrade before the desired operating lifetime of the fuel cell is achieved. Also such silicone rubbers release materials that contaminate the fuel cell, thereby adversely affecting the performance of the fuel cell. Molding of liquid silicone rubber onto separator plates is also described in U.S. Pat. No. 5,264,299. To increase the operating lifetime thereof, more durable elastomers such as fluoroelastomers, as described in U.S. Pat. No. 6,165,634, and polyolefin hydrocarbons, as described in U.S. Pat. No. 6,159,628, have been proposed to bond the surface of fuel cell components. These compositions, however, do not impregnate well porous structures such as the gas diffusion layer. The viscosities of these thermoplastic and fluoroelastomers compositions are also too high for injection molding without damaging the substrate or impregnating the porous structure.

U.S. Patent Application Publication No. US 2005/0263246 A1 describes a method for making an edge-seal on a membrane electrode assembly that impregnates the gas diffusion layer using a thermoplastic film having melting point or a glass transition temperature of about 100° C. Such a method is problematic because the maximum temperature a proton exchange membrane can be exposed to will limit the melt processing temperature. The seal will then limit the upper operating temperature of the fuel cell. For example, proton exchange membranes can typically only be exposed to a maximum temperature of 130° C., while normally operating at a temperature of at least 90° C. Thus, the normal and maximum operating temperatures of fuel cells will be limited by the bonding methods of this disclosure.

U.S. Pat. No. 6,884,537 described the use of rubber gaskets with sealing beads for sealing fuel cell components. The gaskets are secured to the fuel cell components through the use of layers of adhesive to prevent movement or slippage of the gaskets. Similarly, International Patent Publication Nos. WO 2004/061338 A1 and WO 2004/079839 A2 describe the use of multi-piece and single-piece gaskets for sealing fuel cell components. The gaskets so described are secured to the fuel cell components through use of an adhesive. The placement of the adhesives and the gaskets are not only time consuming, but problematic because misalignment may cause leakage and loss of performance of the fuel cell.

U.S. Pat. No. 6,875,534 describes a cured-in-place composition for sealing a periphery of a fuel cell separator plate. The cured-in-place composition includes a polyisobutylene polymer having a terminal allyl radial at each end, an organopolysiloxane, an organohydrogenpolysiloxane having at least two hydrogen atoms each attached to a silicon atom and a platinum catalyst. U.S. Pat. No. 6,451,468 describes a formed-in-place composition for sealing a separator, an electrode or an ion exchange membrane of a fuel cell. The formed-in-place composition includes a linear polyisobutylene perfluoropolyether having a terminal alkenyl group at each end, a cross-linker or hardener having at least two hydrogen atoms each bonded to a silicon atom, and a hydrosilylation catalyst. The cross-linked density and the resultant properties of these compositions are limited by using linear polyisobutylene oligomers having an allyl or alkenyl functionality of two. Functionality of these compositions is modified by varying the hydrosilyl functionality, which limits the properties of the resultant compositions.

International Patent Publication No. WO 2004/047212 A2 describes the use of a foam rubber gasket, a liquid silicone sealant or a solid fluoroplastic for sealing fluid transport layer or a gas diffusion layer of a fuel cell. The use of solid gaskets, i.e., foam rubber and/or solid fluoroplastic tape or film, makes placement of these materials and subsequent alignment of the fuel cell components and gaskets time consuming and problematic.

U.S. Patent Application Publication No. 2003/0054225 describes the use of rotary equipment, such as drums or rollers, for applying electrode material to fuel cell electrodes. While this publication describes an automated process for forming fuel cell electrodes, the publication fails to address the sealing concerns of the formed fuel cells.

Despite the state of the art, there remains a need for a sealant composition suitable for use with electrochemical cell components, desirably a UV-curable sealant.

SUMMARY OF THE INVENTION

In one aspect of the present invention, a fuel cell is provided. The fuel cell includes a fuel cell component having a cured sealant, where the cured sealant includes a telechelic-functional polyisobutylene, an organhydrogenosilane crosslinker, a platinum catalyst and a photoinitiator. The telechelic-functional polyisobutylene may include an alkenyl terminated diallyl polyisobutylene oligomer. The fuel cell component may be a cathode flow field plate, an anode flow field plate, a resin frame, a gas diffusion layer, an anode catalyst layer, a cathode catalyst layer, a membrane electrolyte, a membrane-electrode-assembly frame, and combinations thereof.

In another aspect of the present invention, a method for forming a fuel cell includes providing a fuel cell component including a substrate; providing a mold having a cavity; positioning the mold so that the cavity is in fluid communication with the substrate; applying a curable liquid sealant composition into the cavity, where the curable sealant composition includes a telechelic-functional polyisobutylene, an organhydrogenosilane crosslinker, a platinum catalyst and a photoinitiator; and curing the composition with actinic radiation. The telechelic-functional polyisobutylene may include an alkenyl terminated diallyl polyisobutylene oligomer. The fuel cell component may be a cathode flow field plate, an anode flow field plate, a resin frame, a gas diffusion layer, an anode catalyst layer, a cathode catalyst layer, a membrane electrolyte, a membrane-electrode-assembly frame, and combinations thereof.

In another aspect of the present invention, a method for forming a fuel cell includes providing a fuel cell component including a substrate; providing a mold having a cavity; positioning the mold so that the cavity is in fluid communication with the substrate; applying a curable liquid sealant composition into the cavity, where the curable sealant composition includes actinic radiation curable material selected from the group consisting of acrylate, urethane, polyether, polyolefin, polyester, copolymers thereof and combinations thereof; and curing the composition with actinic radiation. The curable composition may include a telechelic-functional polyisobutylene, such as an alkenyl terminated diallyl polyisobutylene oligomer. The fuel cell component may be a cathode flow field plate, an anode flow field plate, a resin frame, a gas diffusion layer, an anode catalyst layer, a cathode catalyst layer, a membrane electrolyte, a membrane-electrode-assembly frame, and combinations thereof.

In another aspect of the present invention, a method for forming a fuel cell includes providing a first fuel cell component including a substrate and a second fuel cell component including a substrate; providing a two-part, actinic radiation curable liquid sealant, where a first part of the sealant includes a telechelic-functional polyisobutylene and an organhydrogenosilane and the second part includes a photoinitiator; applying the first part of the sealant to the substrate of the first fuel cell component; applying the second part of the sealant to the substrate of the second fuel cell component; juxtaposingly aligning the substrates of the first and second fuel cell components; and curing the sealant with actinic radiation. The first or second fuel cell component, which may be the same or different, may be a cathode flow field plate, an anode flow field plate, a resin frame, a gas diffusion layer, an anode catalyst layer, a cathode catalyst layer, a membrane electrolyte, a membrane-electrode-assembly frame, and combinations thereof. The step of aligning the substrates may further include providing a mold having a cavity; and positioning the mold so that the cavity is in fluid communication with the substrates. Desirably, the mold is transmissive to actinic radiation, such as UV radiation.

DETAILED DESCRIPTION OF THE INVENTION

The present invention is directed to a method for bonding and compositions for bonding components of an electrochemical cell. As used herein, an electrochemical cell is a device which produces electricity from chemical sources, including but not limited to chemical reactions and chemical combustion. Useful electrochemical cells include fuel cells, dry cells, wet cells and the like. A fuel cell, which is described in greater detail below, produces electricity from chemical reactants. A wet cell has a liquid electrolyte. A dry cell has an electrolyte absorbed in a porous medium or otherwise restrained from being flowable.

Figure 1:
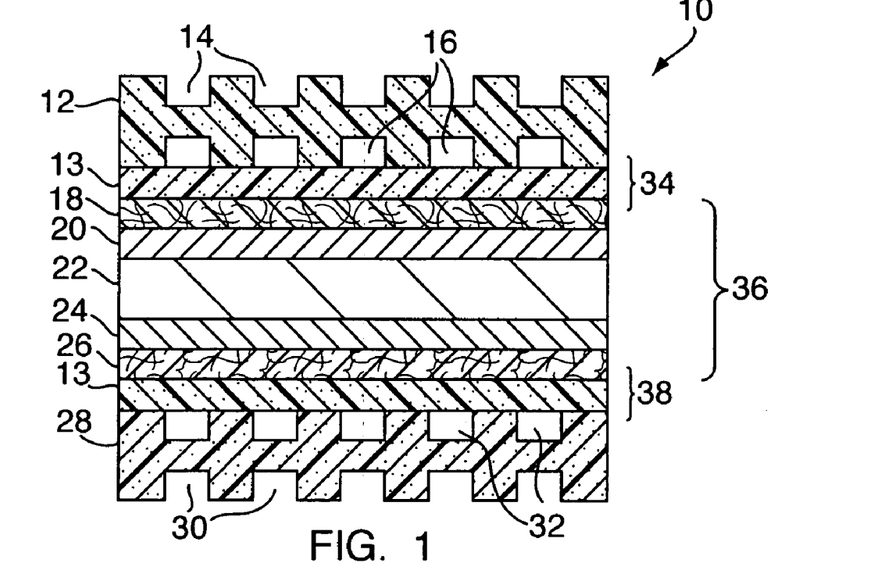
FIG. 1 is a cross-sectional view of a fuel cell having an anode flow field plate, a gas diffusion layer, an anode catalyst, a proton exchange membrane, a cathode catalyst, a second gas diffusion layer, and a cathode flow field plate.

FIG. 1 shows a cross-sectional view of the basic elements of an electrochemical fuel cell, such as fuel cell 10. Electrochemical fuel cells convert fuel and oxidant to electricity and reaction product. Fuel cell 10 consists of an anode flow field plate 12 with open face coolant channels 14 on one side and anode flow channels 16 on the second side, a resin plate 13, a gas diffusion layer 18, an anode catalyst 20, a proton exchange membrane 22, a cathode catalyst 24, a second gas diffusion layer 26, a second resin plate 13 and a cathode flow field plate 28 with open face coolant channels 30 on one side and cathode flow channels 32 on the second side, interrelated as shown in FIG. 1. The gas diffusion layer 18, the anode catalyst 20, the proton exchange membrane 22, the cathode catalyst 24 and the second gas diffusion layer 26 combination is often referred to as a membrane electrode assembly 36. Gas diffusion layers 18 and 26 are typically formed of porous, electrically conductive sheet material, such as carbon fiber paper. The present invention is not, however, limited to the use of carbon fiber paper and other materials may suitably be used. Fuel cells are not, however, limited to such a depicted arrangement of components. The anode and cathode catalyst layers 20 and 24 are typically in the form of finely comminuted platinum. The anode 34 and cathode 38 are electrically coupled (not shown) to provide a path for conducting electrons between the electrodes to an external load (not shown). The flow field plates 12 and 28 are typically formed of graphite impregnated plastic, compressed and exfoliated graphite; porous graphite; stainless steel or other graphite composites. The plates may be treated to effect surface properties, such as surface wetting, or may be untreated. The present invention is not, however, limited to the use of such materials for use as the flow field plates and other materials may suitably be used. For example, in some fuel cells the flow field plates are made from a metal or metal containing material, typically, but not limited to, stainless steel. The flow field plates may be bipolar plates, i.e., a plate having flow channels on opposed plate surfaces, as depicted in FIG. 1. Alternatively, the bipolar plates may be made by securing mono-polar plates together.

Some fuel cell designs utilize resin frames 13 between the membrane electrode assembly 36 and the separator plates 12, 28 to improve the durability of the membrane electrode assembly 36 and afford the correct spacing between the membrane electrode assembly 36 and separator plates 12, 28 during fuel cell assembly. In such a design, it is necessary have a seal between the separator plates 12, 28 and the resin frames 13.

The present invention is not limited to the fuel cell components and their arrangement depicted in FIG. 1. For example, a direct methanol fuel cell ("DMFC") can consist of the same components shown in FIG. 1 less the coolant channels. Further, the fuel cell 10 can be designed with internal or external manifolds (not shown).

While this invention has been described in terms of a proton exchange membrane (PEM) fuel cell, it should be appreciated that the invention is applicable to any type of fuel cell. The concepts in this invention can be applied to phosphoric acid fuel cells, alkaline fuel cells, higher temperature fuel cells such as solid oxide fuel cells and molten carbonate fuel cells, and other electrochemical devices.

At anode 34, a fuel (not shown) traveling through the anode flow channels 16 permeates the gas diffusion layer 18 and reacts at the anode catalyst layer 20 to form hydrogen cations (protons), which migrate through the proton exchange membrane 22 to cathode 38. The proton exchange membrane 22 facilitates the migration of hydrogen ions from the anode 34 to the cathode 38. In addition to conducting hydrogen ions, the proton exchange membrane 22 isolates the hydrogen-containing fuel stream from the oxygen-containing oxidant stream.

At the cathode 38, oxygen-containing gas, such as air or substantially pure oxygen, reacts with the cations or hydrogen ions that have crossed the proton exchange membrane 22 to form liquid water as the reaction product. The anode and cathode reactions in hydrogen/oxygen fuel cells are shown in the following equations:

Anode reaction: $H_2 \rightarrow 2H^+ + 2e^-$ (I)

Cathode reaction: $\frac{1}{2}O_2 + 2H^+ + 2e^- \rightarrow H_2O$ (II)

Figure 2:
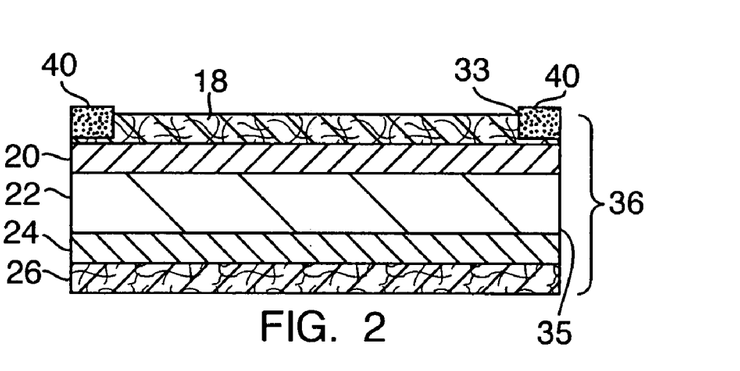
FIG. 2 is a cross-sectional view of a membrane electrode assembly for a fuel cell having a sealant disposed at a peripheral portion of the assembly.

FIG. 2 depicts the membrane electrode assembly 36 having a cured or curable composition 40 at or near the peripheral portion 33 of the membrane electrode assembly 36. As described below, the composition 40 is useful for sealing and/or bonding different components of the fuel cell to one and the other.

Figure 3:
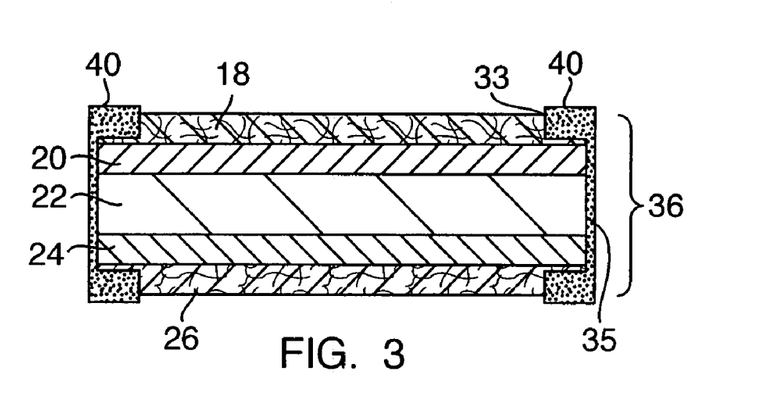
FIG. 3 is a cross-sectional view of a membrane electrode assembly for a fuel cell having a sealant disposed at a peripheral portion and over the peripheral edge portion of the assembly.

The present invention, however, is not limited to having fuel cell components, such as or the membrane electrode assembly 36, with the composition 40 at or near the peripheral portion 33 of the membrane electrode assembly 36. For example, as depicted in FIG. 3, the curable or curable composition 40 may be disposed at or near the peripheral portion 33 of the membrane electrode assembly 36 and cover peripheral edge portions 35 of the membrane electrode assembly 36.

Figure 4:
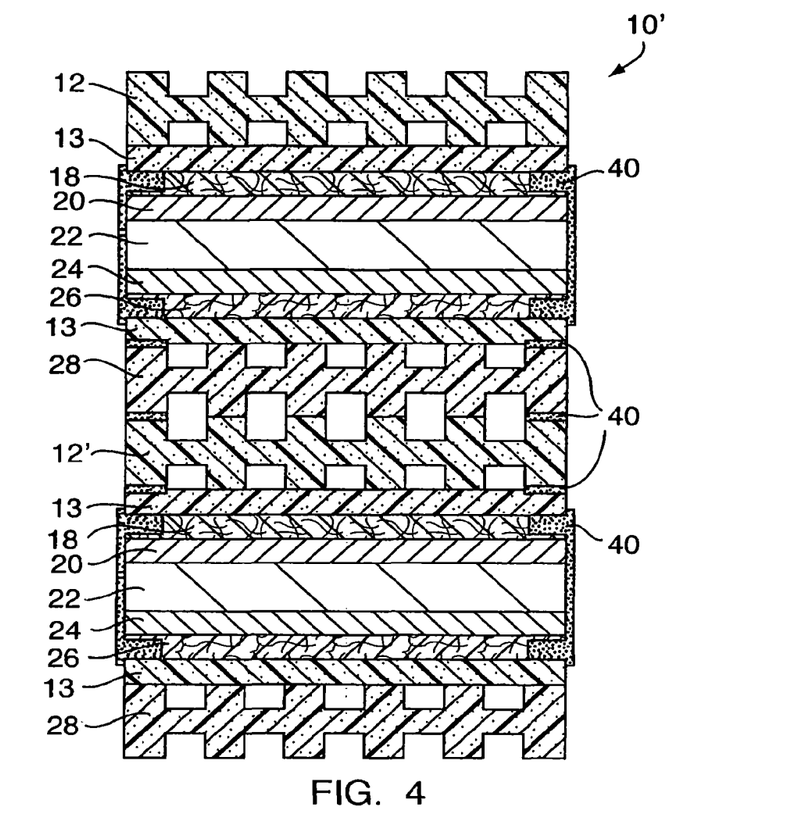
FIG. 4 is a cross-sectional view of a fuel cell having a sealant disposed between the membrane electrode assembly and the flow field plates of a fuel cell to form a stacked fuel cell assembly.

FIG. 4 shows a cross-sectional view of the basic elements of fuel cell 10 in which certain of the adjacent elements have a cured or curable composition 40 therebetween to provide a fuel assembly 10'. As depicted in FIG. 4, composition 40 seals and/or bonds the anode flow field plate 12 to the gas diffusion layer 18 or the membrane electrode assembly 36. The cathode field plate 28 is also sealed and/or bonded to the gas diffusion layer 26 or the membrane electrode assembly 36. In this embodiment, fuel cell assembly 10' often has a preformed membrane electrode assembly 36 anode with the anode catalyst 20 and the cathode catalyst 24 disposed thereon. The composition 40 disposed between the various components of the fuel cell assembly 10' may be the same composition or may be different compositions. Additionally, as depicted in FIG. 4, composition 40 may seal and/or bond the cathode flow plate 28 to a component of a second fuel cell, such as a second anode flow field plate 12'. Further, as depicted in FIG. 4, composition 40 may seal and/or bond the second anode flow field plate 12' to a component of a second fuel cell, such as a second membrane electrode assembly 36'. In such a manner, the fuel cell assembly 10' is formed of multiple fuel cells having components sealingly and/or adhesively adjoined to provide a multiple cell electrochemical device.

Figure 5:
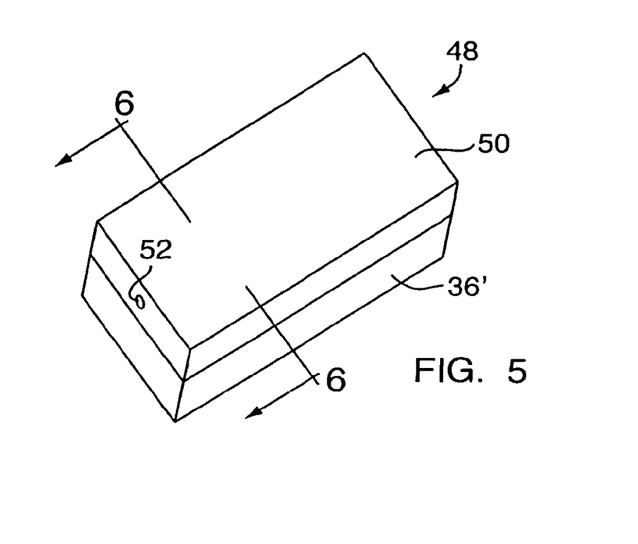
FIG. 5 is a perspective view of a mold having a top and a bottom mold member for forming a gasket in accordance with the present invention.
Figure 8:
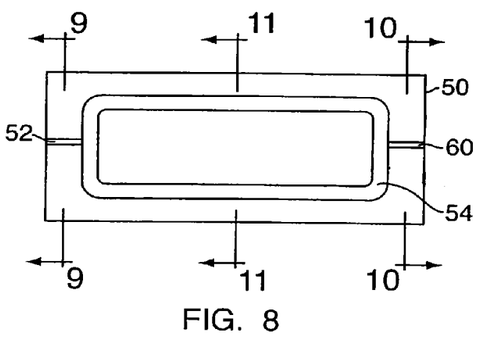
FIG. 8 is a bottom view of the top mold member of FIG. 7 taken along the 8-8 axis.

FIG. 5 is a perspective view of a mold 48 useful for forming cured-in-place gaskets according to the present invention. The mold 48 includes an upper mold member 50, a lower mold member 36', and an injection port 52, inter-related as shown. In this embodiment, composition 40 is disposed onto the lower mold member 36' to form a gasket thereat or thereon. In this embodiment of the present invention, the lower mold member 36' is desirably a fuel cell component, for example membrane electrode assembly 36. The present invention, however, is not limited to the use of the membrane electrode assembly 36 as the bottom mold component, and other fuel cell components may be the bottom mold component. As depicted in FIG. 8, the injection port 52 is in fluid communication with the mold cavity 54.

Figure 6:
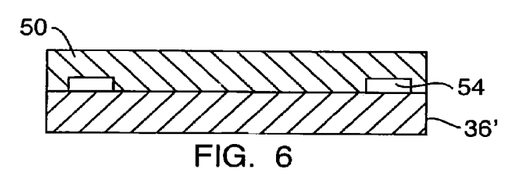
FIG. 6 is a cross-sectional view of the mold of FIG. 5 taken along the 6-6 axis.

FIG. 6 is a cross-sectional view of the mold 48 of FIG. 5 taken along the 6-6 axis. As depicted in FIG. 6, the upper mold member 50 includes a mold cavity 54. Liquid gasket-forming compositions may be introduced into the mold cavity 54 via the injection port 52.

Figure 7:
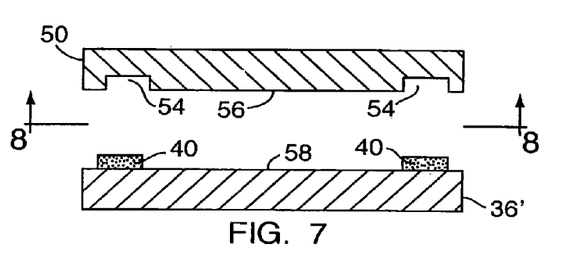
FIG. 7 is an exploded view of the mold of FIG. 6 depicting the top mold member and the bottom mold member.

FIG. 7 is a partial-break-away view of the mold 48 of FIG. 6. Mold member 50 includes a mating surface 56, and mold member 36' includes a mating surface 58. The mold members 50 and 36' may be aligned to one and the other, as depicted in FIG. 6, such that the mating surfaces 56 and 58 are substantially juxtaposed to one and the other. As depicted in FIG. 7 a gasket 40 is removed from the mold cavity 54 and is attached to the mating surface 58.

As depicted in FIG. 8, the mold cavity 54 is in the shape of a closed perimetric design. Although mold cavity 54 is depicted as a rounded rectangle in FIG. 8, the present invention is not so limited and other shaped cavities may suitably be used. Further, while the cross-sectional shape of the mold cavity 54 is depicted as being rectangular or square in FIG. 7, the present invention is not so limited and other cross-sectional shapes may suitably be used, such as circular, oval, or shaped geometries having extensions for improved sealing.

As depicted in FIG. 8, the mold 50 may contain a second port 60. The second port 60 is in fluid communication with the mold cavity 54. The second port 60 may be used to degas the cavity 54 as it is being filled with the gasket-forming material. As the gasket-forming material in introduced into the cavity 54 via the port 52, air may escape via the second port 60 to degas the mold cavity 54. The size of the second port 60 is not limiting to the present invention. Desirably, the size, i.e., the cross-section extent, of the second port 60 is minimized to allow for the egress of air, but small enough to limit liquid flow of the gasket-forming material therethrough. In other words, the size of the second port 60 may be pin-hole sized where air can flow through while inhibiting substantial flow of liquid gasket-forming material. Further, the present invention is not limited to the use of a single port 52 or a single port 60, and multiple ports may be used for the introduction of the gasket material and/or the venting of air.

Figure 9:
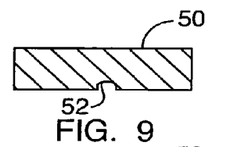
FIG. 9 is a left elevational view of the top mold member of FIG. 8 taken along the 9-9 axis.

FIG. 9 is a cross-sectional view of the mold member 50 taken along the 9-9 axis of FIG. 8. As depicted in FIG. 9, the injection port 52 may suitably be a cavity or bore in the mold member 50. The portion of the injection port 52 may be threaded (not shown) or have a valve (not shown) or a tubing or a hose (not shown) through which the gasket-forming material may be delivered.

Figure 10:
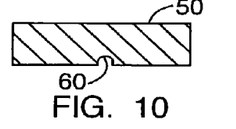
FIG. 10 is a right elevational view of the top mold member of FIG. 8 taken along the 10-10 axis.

FIG. 10 is a cross-sectional view of the mold member 50 taken along the 10-10 axis of FIG. 8. As depicted in FIG. 10, the port 60 may suitably be a cavity or bore in the mold member 50. The portion of the port 60 may have a valve (not shown) for controlling the egress of air and/or gasket-forming material.

Figure 11:
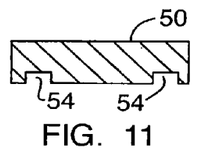
FIG. 11 a cross-sectional view of the top mold member of FIG. 8 taken along the 11-11 axis.

FIG. 11 is a cross-sectional view of the mold member 50 taken along the 11-11 axis of FIG. 8. The mold cavity 54 is depicted as extending into the mold member 50 at its mating surface 56.

Figure 12:
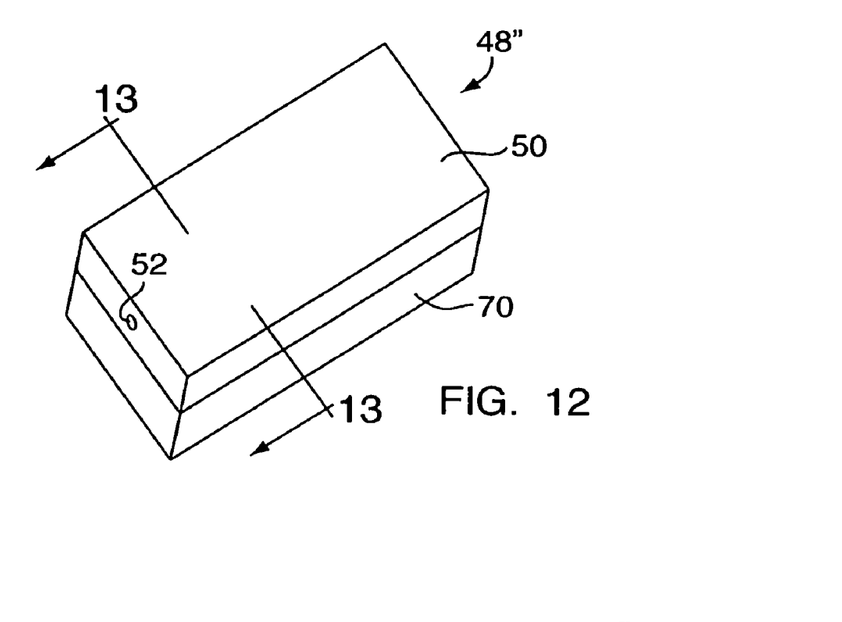
FIG. 12 is a perspective view of an alternative molds according to the present invention.
Figures 13A, 13B:
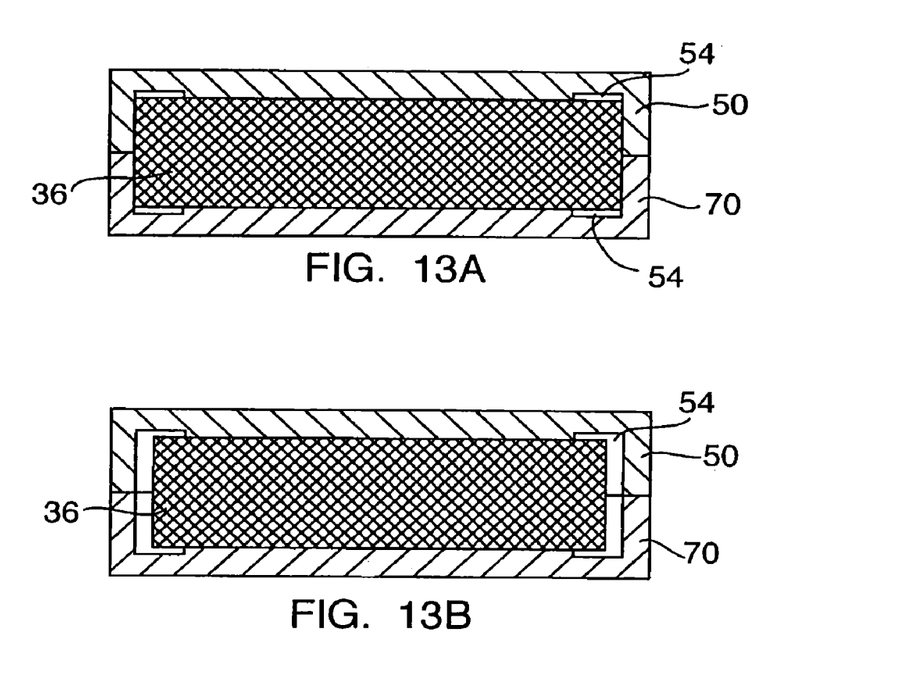
FIGS. 13A and 13B are cross-sectional views of the mold of FIG. 12 taken along the 13-13 axis showing a fuel cell component disposed within the mold.

FIG. 12 is a perspective view of a mold 48" useful for forming cured-in-place gaskets according to the present invention. The mold 48" includes an upper mold member 50, a lower mold member 70. As depicted in FIGS. 13A and 13B, the mold members 50 and 70 are fittable together in a fashion as discussed above and are configured such that a fuel cell component, such as membrane electrode assembly 36 may be disposed therebetween. As depicted in FIG. 13A, the mold 48" of the present invention may be used to form the gasket 40 on peripheral portions of the opposed sides of the fuel cell component 36. As depicted in FIG. 13B, the mold 48" of the present invention may also be used to form the gasket 40 on opposed sides and over the peripheral sides of the fuel cell component 36.

Figure 14:
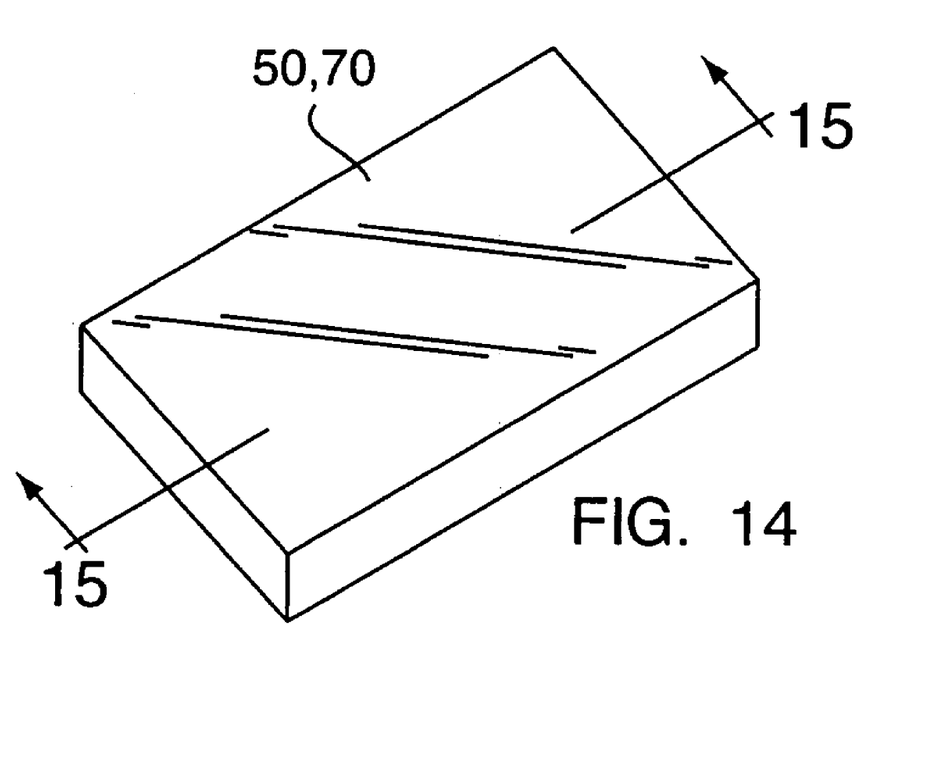
FIG. 14 is a perspective view of the top mold member of FIG. 5 or 12 depicting the top mold member having transparent material.
Figure 15:
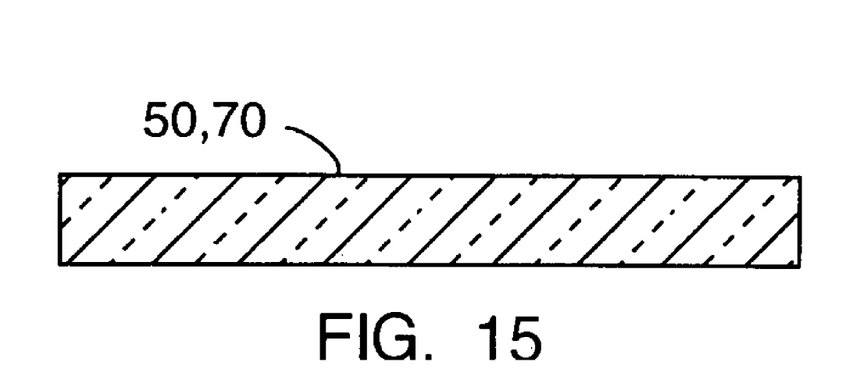
FIG. 15 is a cross-sectional view of the transparent top mold member of FIG. 14 taken along the 15-15 axis.

FIG. 14 is a perspective view of the mold member 50, 70 depicting that the mold member 50, 70 may be made of or may include a transparent material. Desirably, the mold member 50, 70 is transparent, i.e., transmissible or substantially transmissible, to actinic radiation, for example UV radiation. A cross-sectional view of the transparent mold member 50, 70 is depicted in FIG. 15.

The method of this aspect of the present invention may further include the step of degassing the cavity prior to injecting or while injecting the liquid, actinic radiation curable, gasket-forming composition. Desirably, the step of degassing includes degassing through the second port 60, which is in fluid communication with the cavity 54.

With the degassing of the cavity 54 and with the above-described fluid properties the liquid composition fully fills the cavity 54 without the need for excessive liquid handling pressures. Desirably, the liquid composition fully fills the cavity 54 at a fluid handling pressure of about 690 kPa (100 psig) or less.

After the composition is cured or at least partially cured, the mold members 50, 36' or 50, 70 may be released from one and the other to expose the gasket, after which the gasket 40 may be removed from the mold cavity 54. The gasket 40 is desirably disposed and/or affixed to the fuel cell component, for example membrane electrode assembly 36.

Although the present invention has been described as top mold members 50, 70 as having a groove or mold cavity 54, the present invention is not so limited. For example, the bottom mold member 36', 70 and/or the fuel cell component, such as membrane exchange membrane 36, may have a groove or mold cavity for placement and formation of the seal in addition to or in replacement to the mold cavity 54 of the top mold members.

Because of the demanding physical property requirements of fuel cell barrier sealants, low surface energy polymers, such as polyisobutylene are desirable. In order to affect crosslinking, telechelic-functional polyisobutylenes are more desirable, such as vinyl-terminated polyisobutylene. The telechelic-functional polyisobutylenes may react with an appropriate soluble organhydrogenosilane crosslinker to form a cured sealant. Typically, prior to the present invention, the cross-linking was done in the presence of a platinum catalyst, as follows:

While hydrosilation-cured organic-based formulations are typically thermally cured using a platinum catalyst, such cures normally require at least one hour at an elevated temperature. Such curing conditions, however, limit continuous fabrication processes.

Desirably, the liquid composition of the present invention may be cured at or about room temperature within a short period of time, for example about 5 minutes or less. More desirably, the liquid composition is cured within 1 minute or less, for example, cured within 30 seconds or less.

In one aspect of the present invention, the cured sealant composition used in the present invention includes an alkenyl terminated polyisobutylene oligomer, for example an alkenyl terminated diallyl polyisobutylene oligomer; optionally, a polyfunctional alkenyl monomer; a silyl hardener or cross-linker having at least one hydrogen atom bonded to a silicon atom; and a hydrosilylation catalyst. Desirably, only about one hydrogen atom bonded is to any silicon atom in the silyl hardener.

The inventive compositions of the present invention have modified molecular structures, resulting in enhanced mechanical properties, cross-link densities and heats of reaction. The compositions of the present invention may be represented by the expression of $(A-A+A_f+B_f)$, where "A-A" represents the alkenyl groups of the alkenyl terminated diallyl polyisobutylene oligomer, i.e., a difunctional alkenyl polyisobutylene ("PIB"), "A" represents an alkenyl group, "B" represents a Si—H group and "f" refers to the number of corresponding functional groups.

When both the alkenyl and hydride are di-functional, the polymerization yields a linear structure. The number of functional hydride groups in such a linear structure, however, limits the overall functionality and cross-linked density of the reacted network. By incorporating three or more alkenyl groups onto a single monomer or oligomer the cross-linking density increases and mechanical properties are improved.

Useful dialkenyl terminated linear poly(isobutylene) oligomers are commercially available from Kaneka Corporation, Osaka, Japan as EP200A, EP400A and EP600A. The three oligomers have the same functionality and have different molecular weights. EP200A, EP400A and EP600A have an approximate molecular weight (Mn) of 5,000, 10,000, and 20,000, respectively.

The compositions of the present invention may also include a silicone having at least two reactive silicon hydride functional groups, i.e., at least two Si—H groups. This component functions as a hardener or cross-linker for the alkenyl terminated diallyl polyisobutylene oligomer. In the presence of the hydrosilation catalyst, the silicon-bonded hydrogen atoms in the cross-linking component undergo an addition reaction, which is referred to as hydrosilation, with the unsaturated groups in the reactive oligomer. Since the reactive oligomer contains at least two unsaturated groups, the silicone cross-linking component may desirably contain at least two silicon-bonded hydrogen atoms to achieve the final cross-linked structure in the cured product. The silicon-bonded organic groups present in the silicone cross-linking component may be selected from the same group of substituted and unsubstituted monovalent hydrocarbon radicals as set forth above for the reactive silicone component, with the exception that the organic groups in the silicone cross-linker should be substantially free of ethylenic or acetylenic unsaturation. The silicone cross-linker may have a molecular structure that can be straight chained, branched straight chained, cyclic or networked.

The silicone cross-linking component may be selected from a wide variety of compounds, that desirably conforms to the formula below:

where at least two of $R^1$, $R^2$ and $R^3$ are H; otherwise $R^1$, $R^2$ and $R^3$ can be the same or different and can be a substituted or unsubstituted hydrocarbon radical from $C_{1-20}$ such hydrocarbon radicals including alkyl, alkenyl, aryl, alkoxy, alkenyloxy, aryloxy, (meth)acryl or (meth)acryloxy; thus the SiH group may be terminal, pendent or both; $R^4$ can also be a substituted or unsubstituted hydrocarbon radical from $C_{1-20}$, such hydrocarbon radicals including a $C_{1-20}$ alkyl, alkenyl, aryl, alkoxy, alkenyloxy, aryloxy, (meth)acryl or (meth)acryloxy, and desirably is an alkyl group such as methyl; x is an integer from 10 to 1,000; and y is an integer from 1 to 20. Desirably, $R^2$ and $R^3$ are not both hydrogen, i.e., $R^1$ is H and either $R^2$ or $R^3$, but not both, is H. Desirably, R groups which are not H are methyl. The silicon hydride crosslinker should be present in amounts sufficient to achieve the desired amount of crosslinking and desirably in amounts of about 0.5 to about 40 percent by weight of the composition, more desirably from about 1 to about 20 percent by weight of the composition.

Useful platinum catalysts include platinum or platinum-containing complexes such as the platinum hydrocarbon complexes described in U.S. Pat. Nos. 3,159,601 and 3,159, 662; the platinum alcoholate catalysts described in U.S. Pat. No. 3,220,972; the platinum complexes described in U.S. Pat. No. 3,814,730; and the platinum chloride-olefin complexes described in U.S. Pat. No. 3,516,946. All of these U.S. patents relating to platinum or platinum-containing catalysts are hereby expressly incorporated herein by reference. Desirably, the platinum or platinum-containing complex is dicarbonyl platinum cyclovinyl complex, platinum cyclovinyl complex, platinum divinyl complex, or combinations thereof. The platinum catalysts are in sufficient quantity such that the composition cures at a temperature of about 130° C. or less, desirably at a temperature of about 100° C. or less, more desirably at a temperature of about 90° C. or less. More desirably, a photoinitiator, such as one or more of the photoinitiators described below, so that compositions of the present invention may be cured by actinic radiation, such as ultraviolet radiation.

In one aspect of the present invention, the liquid gasket-forming material may include actinic radiation curable acrylates, urethanes, polyethers, polyolefins, polyesters, copolymers thereof and combinations thereof. Desirably, the curable material includes a (meth)acryloyl terminated material having at least two (meth)acryloyl pendant groups. Desirably, the (meth)acryloyl pendant group is represented by the general formula: —OC(O)C($R^1$)=$CH_2$, where $R^1$ is hydrogen or methyl. More desirably, the liquid gasket-forming material is a (meth)acryloyl-terminated poly acrylate. The (meth)acryloyl-terminated poly acrylate may desirably have a molecular weight from about 3,000 to about 40,000, more desirably from about 8,000 to about 15,000. Further, the (meth)acryloyl-terminated poly acrylate may desirably have a viscosity from about 200 Pas (200,000 cPs) to about 800 Pas (800,000 cPs) at 25° C. (77° F.), more desirably from about 450 Pas (450,000 cPs) to about 500 Pas (500,000 cPs). Details of such curable (meth)acryloyl-terminated materials may be found in European Patent Application No. EP 1 059 308 A1 to Nakagawa et al., and are commercially available from Kaneka Corporation, Japan.

Desirably, the liquid composition includes a photoinitiator. A number of photoinitiators may be employed herein to provide the benefits and advantages of the present invention to which reference is made above. Photoinitiators enhance the rapidity of the curing process when the photocurable compositions as a whole are exposed to electromagnetic radiation, such as actinic radiation. Examples of suitable photoinitiators for use herein include, but are not limited to, photoinitiators available commercially from Ciba Specialty Chemicals, under the "IRGACURE" and "DAROCUR" trade names, specifically "IRGACURE" 184 (1-hydroxycyclohexyl phenyl ketone), 907 (2-methyl-1-[4-(methylthio)phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4,4-trimethyl pentyl) phosphine oxide and 2-hydroxy-2-methyl-1-phenyl-propan-1-one), and 819 [bis(2,4,6-trimethyl benzoyl) phenyl phosphine oxide] and "DAROCUR" 1173 (2-hydroxy-2-methyl-1-phenyl-1-propan-1-one) and 4265 (the combination of 2,4,6-trimethylbenzoyldiphenylphosphine oxide and 2-hydroxy-2-methyl-1-phenyl-propan-1-one); and the visible light [blue] photoinitiators, dl-camphorquinone and "IRGACURE" 784DC. Of course, combinations of these materials may also be employed herein.

Other photoinitiators useful herein include alkyl pyruvates, such as methyl, ethyl, propyl, and butyl pyruvates, and aryl pyruvates, such as phenyl, benzyl, and appropriately substituted derivatives thereof. Photoinitiators particularly well-suited for use herein include ultraviolet photoinitiators, such as 2,2-dimethoxy-2-phenyl acetophenone (e.g., "IRGACURE" 651), and 2-hydroxy-2-methyl-1-phenyl-1-propane (e.g., "DAROCUR" 1173), bis(2,4,6-trimethyl benzoyl) phenyl phosphine oxide (e.g., "IRGACURE" 819), and the ultraviolet/visible photoinitiator combination of bis(2,6-dimethoxybenzoyl-2,4,4-trimethylpentyl) phosphine oxide and 2-hydroxy-2-methyl-1-phenyl-propan-1-one (e.g., "IRGACURE" 1700), as well as the visible photoinitiator bis($\eta^5$-2,4-cyclopentadien-1-yl)-bis[2,6-difluoro-3-(1H-pyrrol-1-yl)phenyl]titanium (e.g., "IRGACURE" 784DC). Useful actinic radiation includes ultraviolet light, visible light, and combinations thereof. Desirably, the actinic radiation used to cure the liquid gasket-forming material has a wavelength from about 200 nm to about 1,000 nm. Useful UV includes, but is not limited to, UVA (about 320 nm to about 410 nm), UVB (about 290 nm to about 320 nm), UVC (about 220 nm to about 290 nm) and combinations thereof. Useful visible light includes, but is not limited to, blue light, green light, and combinations thereof. Such useful visible lights have a wavelength from about 450 nm to about 550 nm.

Optionally, a release agent may be applied to the cavity 54 prior to the introduction of the liquid composition. The release agent, if needed, helps in the easy removal of the cured gasket from the mold cavity. Useful mold release compositions include, but are not limited to, dry sprays such as polytetrafluoroethylene, and spray-on-oils or wipe-on-oils such as silicone or organic oils. Useful mold release compositions include, but are not limited, to compositions including $C_6$ to $C_{14}$ perfluoroalkyl compounds terminally substituted on at least one end with an organic hydrophilic group, such as betaine, hydroxyl, carboxyl, ammonium salt groups and combinations thereof, which is chemically and/or physically reactive with a metal surface. A variety of mold releases are available, such as those marketed under Henkel's Frekote brand. Additionally, the release agent may be a thermoplastic film, which can be formed in the mold shape.

In addition to the above-described (meth)acryloyl-terminated poly(meth)acrylate composition, the composition may further include a (meth)acryloyl-terminated compound having at least two (meth)acryloyl pendant groups selected from the group consisting of (meth)acryloyl terminated polyether, a (meth)acryloyl-terminated polyolefin, (meth)acryloyl-terminated polyurethane, a (meth)acryloyl-terminated polyester, a (meth)acryloyl-terminated silicone, copolymers thereof, and combinations thereof.

The composition may further include a monofunctional (meth)acrylate. Useful monofunctional (meth)acrylates may be embraced by the general structure $CH_2=C(R)COOR^2$ where R is H, $CH_3$, $C_2H_5$ or halogen, such as Cl, and $R^2$ is $C_{1-8}$ mono- or bicycloalkyl, a 3 to 8-membered heterocyclic radial with a maximum of two oxygen atoms in the heterocycle, H, alkyl, hydroxyalkyl or aminoalkyl where the alkyl portion is $C_{1-8}$ straight or branched carbon atom chain. Among the specific monofunctional (meth)acrylate monomers particularly desirable, and which correspond to certain of the structures above, are hydroxypropyl methacrylate, 2-hydroxyethyl methacrylate, methyl methacrylate, tetrahydrofurfuryl methacrylate, cyclohexyl methacrylate, 2-aminopropyl methacrylate and the corresponding acrylates.

In another aspect of the present invention, the poly(meth) acrylate composition of the present invention may optionally include from about 0% to 90% poly(meth)acrylate polymer or copolymer, from about 0% to about 90% poly(meth)acrylate polymer or copolymer containing at least 2(meth)acrylate functional; from about 0% by weight to about 90% by weight monofunctional and/or multifunctional (meth)acrylate monomers; from about 0% by weight to about 20% by weight photoinitiator; from about 0% by weight to about 20% by weight additives, such as antioxidants; from about 0% by weight to about 20% by weight fillers, such as fumed silica; from about 0% by weight to about 20% by weight rheology modifier; from about 0% by weight to about 20% by weight adhesion promoter; and/or from about 0% by weight to about 20% by weight fluorescent agents or pigments.

The following non-limiting examples are intended to further illustrate the present invention.

EXAMPLES

Example 1

Inventive base formulations were prepared as follows:

TABLE 1

Polyisobutylene Sealant Base Formulation
(Inventive Base Formulation No. 1)

| Supplier | Chemical Description | Wt % |
|---|---|---|
| Kaneka | Epion EP200A | 64.50% |
| Kaneka | Epion EP400A | 21.50% |
| Degussa | Trivinylcyclohexane reactive diluent | 1.17% |
| Kaneka | CR300 Crosslinker | 12.83% |
| | Total: | 100.00% |

EP200A and EP400A are resins supplied by Kaneka.
CR300 is a phenylsiloxane crosslinker supplied by Kaneka.

Mixing Procedure:
1. Add all ingredients.
2. Mix with Cowles blade for 15 minutes until homogeneous.

While conventionally heat cure would be used to effect the hydrosilation reaction, with temperatures in excess of 100° C. for at least on hour being used, here a UV-activatable platinum complex is used in place of the heat-activated platinum catalyst. The hydrosilation reaction is initiated upon irradiation and continues after removal of the radiation (post cure).

UV-labile platinum complexes examined include:

Platinum (II) 2,4-pentanedionate (Pt(acac)$_2$)

(Trimethyl)methylcyclopentadienylplatinum (IV) (TMMCP)

As shown below, substantial reductions in cure time were realized along with elimination of potentially deleterious heat:

Example 2

UV-Cured Polyisobutylene/Silane

Inventive Base Formulation No. 1 from Example 1, i.e., Unsaturated Polyisobutylene with phenylsilane crosslinker.

Experimental

The following catalyst combinations were evaluated:

Inventive Composition No. 1. Pt(acac)$_2$, (49.6% Pt) @ 100 ppm Pt:

Mix 100 g Inventive Base Formulation No. 1+0.68 g 3% Pt(acac)$_2$ in CH$_2$Cl$_2$.

Inventive Composition No. 2. (Trimethyl)methylcyclopentadienylplatinum (IV) (TMMCP), (61.1% Pt) @ 50 ppm Pt:

Mix 100 g Inventive Base Formulation No. 1+0.16 g 5% TMMCP in EtOAc.

Inventive Composition No. 3. (Trimethyl)methylcyclopentadienylplatinum (IV) (TMMCP), (61.1% Pt) @ 100 ppm Pt:

Mix 100 g Inventive Base Formulation No. 1+0.32 g 5% TMMCP in EtOAc.

Irradiate 5 gram samples in small aluminum pans with the Oriel lamp at 8 mW/cm$^2$ UV-B or the Zeta 7216 at 100 mW/cm$^2$ UV-B.

TABLE 2

Oriel Intensity: 8 mW/cm$^2$
Zeta Intensity: 100 mW/cm$^2$

| Inventive Composition | Irradiation Time (min) | Lamp | Cured Properties | 30 Minute Properties | 24 Hour Properties |
|---|---|---|---|---|---|
| 1 | 5 | Oriel | Viscous, wet | Tacky, firm | Slight tack, firm |
| 2 | 5 | Oriel | Tacky, some cure | No change | Slight tack, firm |
| 3 | 5 | Oriel | Very slight tack; firm | No change | No change |
| 3 | 1 | Zeta | Tacky, firm | No change | No change |

The above results confirm the feasibility UV-activated platinum cure, with cure times greatly reduced from heat cure. Inventive Composition No. 3 cured with the Oriel lamp exhibited surface properties as good or better than the heat cured control. As the data shows, it appears more desirable to utilize lower intensities for longer time periods than higher intensities for shorter irradiation times. The previously-mentioned post-cure is most noticeable in the less active systems (1, 2).

Example 3

UV-Cured Polyisobutylene/Silane, 200 ppm Platinum

Inventive Base Formulation No. 1 from Example 1, i.e. Unsaturated polyisobutylene with phenylsilane crosslinker.

Experimental

Evaluate the following catalyst combinations:

Inventive Composition No. 4. Pt(acac)$_2$, (49.6% Pt) @ 200 ppm Pt:

Mix 50 g Inventive Base Formulation No. 1+0.68 g 3% Pt(acac)$_2$ in CH$_2$Cl$_2$.

Inventive Composition No. 5. (Trimethyl)methylcyclopentadienylplatinum (IV) (TMMCP), (61.1% Pt) @ 200 ppm Pt:

Mix 50 g Inventive Base Formulation No. 1+0.32 g 5% TMMCP in EtOAc.

Irradiate 5 gram samples in small aluminum pans with the Oriel lamp at 8 mW/cm$^2$ UV-B.

TABLE 3

Oriel Intensity: 8 mW/cm$^2$

| Inventive composition | Irradiation Time (min) | Lamp | Cured Properties | 30 Minute Properties | 24 Hour Properties |
|---|---|---|---|---|---|
| 4 | 1 | Oriel | No Cure | Very tacky, soft | Slight tack, firm |
| 4 | 2 | Oriel | No cure | Tacky, soft | Slight tack, firm |
| 4 | 3 | Oriel | Tacky, soft | Slight tack, firm | Dry surface, firm |
| 5 | 1 | Oriel | Very tacky, soft | Tacky, soft | Slight tack, firm |
| 5 | 2 | Oriel | Slight tack, soft | No change | Dry surface, firm |
| 5 | 3 | Oriel | Slight tack, firm | No change | Dry surface, firm |

As shown above, optimum cure is obtained after 3 minutes of irradiation, with post cure noticeably evident after 24 hours and most noticeable in the Pt(acac)$_2$ systems.

What is claimed is:

1. A method for forming a fuel cell including:
providing a fuel cell component including a substrate;
providing a mold having a cavity;
positioning the mold so that the cavity is in fluid communication with the substrate;
applying a curable liquid sealant composition into the cavity, wherein the curable sealant composition comprises a (meth)acryloyl terminated material and a photoinitiator; and
curing the composition with actinic radiation.

2. The method of claim 1, wherein the composition further comprises a (meth)acryloyl-terminated compound having at least two (meth)acryloyl pendant groups selected from the group consisting of (meth)acryloyl-terminated polyether, a (meth)acryloyl-terminated polyolefin, (meth)acryloyl-terminated polyurethane, a (meth)acryloyl-terminated polyester, a (meth)acryloyl-terminated silicone, copolymers thereof; a monofunctional (meth)acrylate; and combinations thereof.

3. The method of claim 1, wherein the fuel cell component is selected from the group consisting of a cathode flow field plate, an anode flow field plate, a resin frame, a gas diffusion layer, an anode catalyst layer, a cathode catalyst layer, a membrane electrolyte, a membrane-electrode-assembly frame, and combinations thereof.

4. The method of claim 1, wherein the mold is transmissive to actinic radiation.

5. A method for forming a fuel cell including:
providing a fuel cell component including a substrate;
providing a mold having a cavity;
positioning the mold so that the cavity is in fluid communication with the substrate;
applying a curable liquid sealant composition into the cavity, wherein the curable sealant composition comprises actinic radiation curable material selected from the group consisting of a (meth)acryloyl terminated material having at least two (meth)acryloyl pendant groups, (meth)acryloyl-terminated urethane, (meth)acryloyl-terminated polyether, (meth)acryloyl-terminated polyolefin, (meth)acryloyl-terminated polyester, copolymers thereof and combinations thereof; and
curing the composition with actinic radiation.

6. The method of claim 5, wherein the curable composition further comprises a monofunctional (meth)acrylate having the general structure $CH_2\!=\!C(R)COOR^2$ where R is H, $CH_3$, $C_2H_5$ or halogen, and $R^2$ is $C_{1-8}$ mono- or bicycloalkyl, a 3 to 8-membered heterocyclic radial with a maximum of two oxygen atoms in the heterocycle, H, alkyl, hydroxyalkyl or aminoalkyl where the alkyl portion is $C_{1-8}$ straight or branched carbon atom chain.

7. The method of claim 5, wherein the fuel cell component is selected from the group consisting of a cathode flow field plate, an anode flow field plate, a resin frame, a gas diffusion layer, an anode catalyst layer, a cathode catalyst layer, a membrane electrolyte, a membrane-electrode-assembly frame, and combinations thereof.

8. A method for forming a fuel cell including:
providing a first fuel cell component including a substrate and a second fuel cell component including a substrate;
providing an actinic radiation curable liquid sealant comprising a (meth)acryloyl terminated material
applying the sealant to the substrate of the first fuel cell component;
juxtapositingly aligning the substrates of the first and second fuel cell components; and
curing the sealant with actinic radiation.

9. The method of claim 8, wherein the curable sealant further comprises a (meth)acryloyl-terminated compound having at least two (meth)acryloyl pendant groups selected from the group consisting of (meth)acryloyl-terminated polyether, a (meth)acryloyl-terminated polyolefin, (meth)acryloyl-terminated polyurethane, a (meth)acryloyl-terminated polyester, a (meth)acryloyl-terminated silicone, copolymers thereof; a monofunctional (meth)acrylate; and combinations thereof.

10. The method of claim 8, wherein the first or second fuel cell component is selected from the group consisting of a cathode flow field plate, an anode flow field plate, a resin frame, a gas diffusion layer, an anode catalyst layer, a cathode catalyst layer, a membrane electrolyte, a membrane-electrode-assembly frame, and combinations thereof.

11. The method of claim 8, wherein the step of applying the sealant includes:
providing a mold having a cavity; and
positioning the mold so that the cavity is in fluid communication with the substrate of the first fuel cell component.

* * * * *